UNITED STATES PATENT OFFICE.

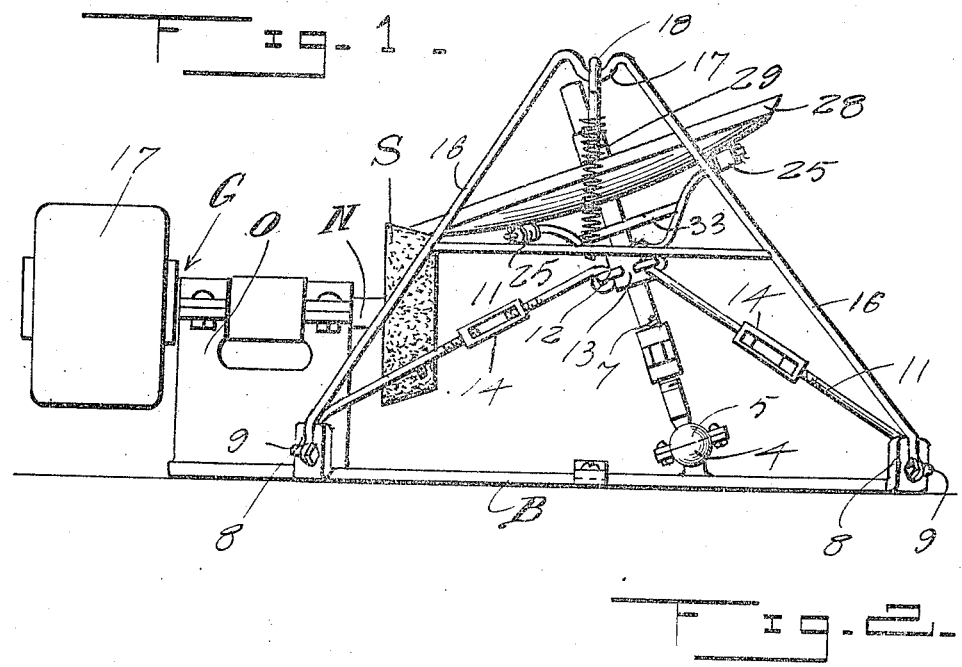

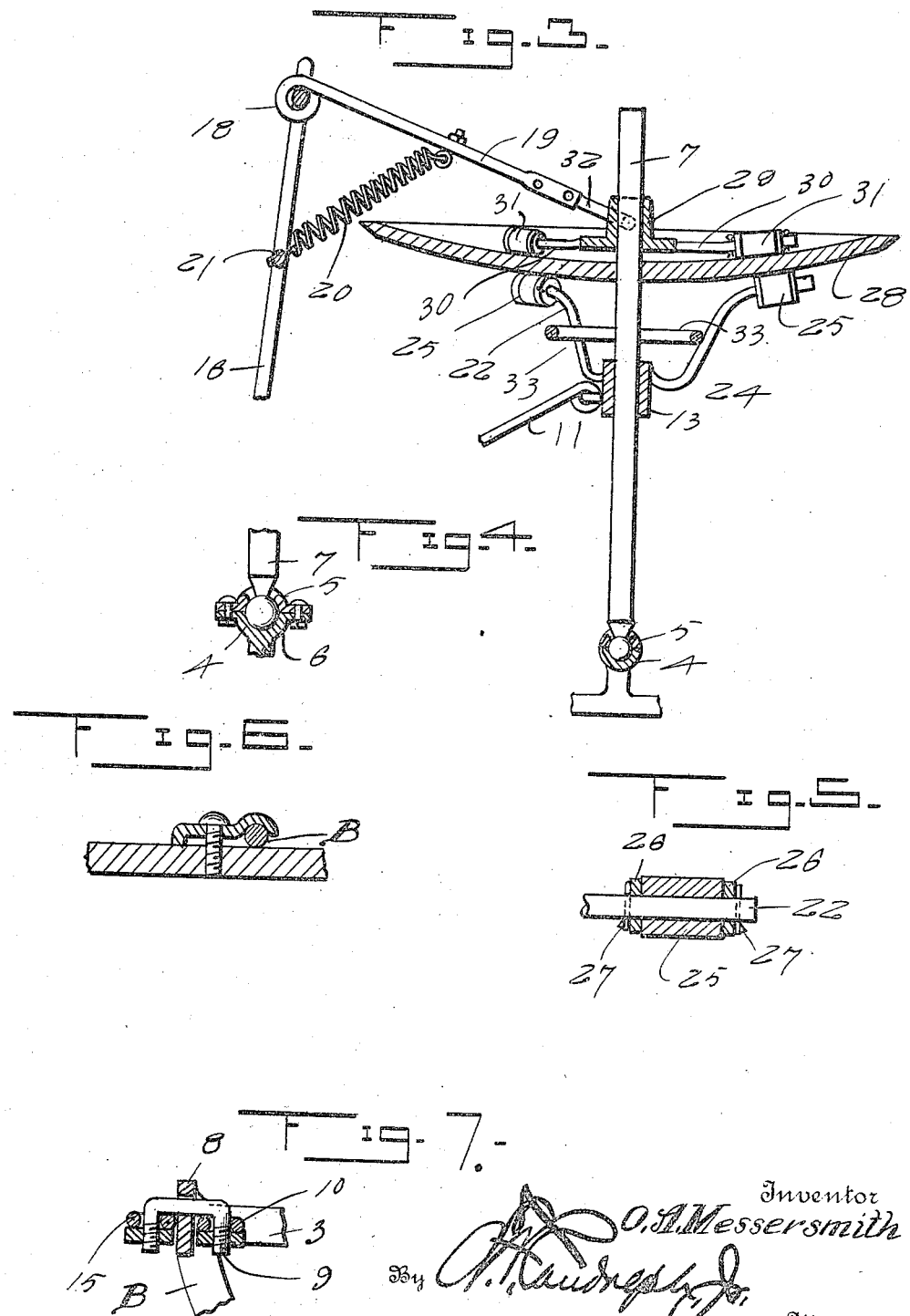

ORVIS A. MESSERSMITH, OF FARNAM, NEBRASKA.

DISK-HOLDER.

1,306,969.  Specification of Letters Patent.  Patented June 17, 1919.

Application filed August 27, 1918. Serial No. 251,628.

*To all whom it may concern:*

Be it known that I, ORVIS A. MESSERSMITH, a citizen of the United States, residing at Farnam, in the county of Dawson and State of Nebraska, have invented certain new and useful Improvements in Disk-Holders; and I do hereby declare the following to be a full, clear, and exact description of the invention, such as will enable others skilled in the art to which it appertains to make and use the same.

This invention relates to disk holders, and more particularly to means for holding a disk of a disk harrow or similar ground working implement, for sharpening purposes.

One of the main objects of the invention is to provide disk holding means of simple construction and operation by means of which the disk to be sharpened or ground may be supported in the proper adjustment for the sharpening operation, this means being also adapted to permit turning of the disk so as to prevent burning thereof by the sharpening medium.

A further object is to provide disk supporting means so constructed as to permit the disk to be readily adjusted so as to have its angle to the sharpening or grinding stone varied, as desired.

Another object is to provide a universal support for the disk supporting elements, means being also provided whereby this universal support may be readily secured in adjustment.

Further objects will appear from the detailed description.

In the drawings:

Figure 1 is a side view of a disk supporting means constructed in accordance with my invention, as applied.

Fig. 2 is a top plan view.

Fig. 3 is a fragmentary sectional view through the disk supporting shaft and associated parts.

Fig. 4 is a fragmentary detail section of the ball and socket mounting for the disk supporting shaft.

Fig. 5 is a detail sectional view of one of the disk supporting rollers.

Fig. 6 is a detail section of the clamp for securing the supporting means in adjustment.

Fig. 7 is a fragmentary detail sectional view of the means for securing the brace and adjusting rods to the base.

The base of the supporting frame, designated generally by B, is of substantially segmental shape comprising the outer arcuate brace rod 1 and the inwardly converging brace rods 2 and 3, the inner ends of which are integrally connected and support the lower element 4 of the socket of the ball and socket joint to which the upper element 5 is detachably secured. The socket thus formed receives a ball 6 formed at the lower end of a disk supporting shaft 7. The shaft 7 is thus supported and mounted by ball and socket means so as to be readily adjusted in any direction. This shaft which is adapted to support the disk to be sharpened is secured in any desired adjustment by means of a movable brace and adjusting rod.

At each end of the outer arcuate rod 1, the base frame B is provided with an integral upwardly directed tab 8. These tabs are adapted to receive angle bolts 9 inserted therethrough and secured in position by nuts in the usual manner. The bolt 9 is inserted through an eye 10 formed at the lower end of the brace and adjusting rod 11, the upper end of which is loosely secured, as at 12, to a collar or sleeve 13 secured on the disk supporting shaft 7. The rod 11 is further provided with a turnbuckle 14 interposed therein by means of which the effective length of the rod may be varied, shaft 7 being provided with a similar turnbuckle. The outer arm of angle bolt 9 is inserted through an eye 15 formed at the lower end of a rod 16 and disposed in the plane of the eye 10. The rods 16 converge upwardly and are integrally connected at their upper ends by an arcuate element 17 which loosely receives an eye 18 of a pressure arm 19. This arm is normally forced downwardly by a tension coil spring 20, the upper end of which is secured to arm 19, the lower end of this spring being secured to a brace bar 21 connecting the two rods 16. In this manner the disk supporting shaft 7 is so supported as to be readily adjusted angularly, and this means for adjusting the shaft also serves to secure it in adjustment.

The collar 13 is provided with a plurality of radiating upwardly disposed arms 22. Each of these arms is of a compound curvature, having its upper portion curved downwardly and outwardly as at 23, and its lower portion curved in substantially semi-circular shape, the convexity of the curve being directed downwardly. Each of the arms 22 is provided, at its upper end, with a roller 25 loosely mounted thereon between end collars 26 secured against movement longitudinally of the arms by cotter pins 27. The roller 25, in practice, is inclined slightly downwardly and inwardly to fit the concaved outer face of a disk 28 loosely mounted on the disk supporting shaft 7. Above the disk, a sleeve 29 is loosely mounted on said shaft and is provided with radiating arms 30 which carry rollers 31 mounted thereon similar to the mounting of rollers 25. The sleeve 29 and arms 30 constitute, in effect, a holding frame or spider which is normally forced downwardly by means of a fork 32 secured to the inner end of the pressure arm 19, the arms of this fork fitting into diametrically opposite recesses formed in the sleeve 29. By means of this spring 20, the spider is forced downwardly so that the disk 28 is held against upward movement on shaft 7 and is gripped frictionally between rollers 25 and 31. To prevent spreading of the arms 22 under the influence of this downward pressure, a reinforcing ring 33 is secured to these arms, as illustrated. It will be understood that the arms 30 and 22 are formed of resilient material of such strength as to normally hold the rollers in comparatively tight engagement with the upper and lower faces of the disk thus normally holding it against free rotation.

This disk holding means is intended to be used with any suitable grinding means such as designated generally by D comprising an electric motor M which serves to rotate a shaft N supported by a bearing O, said shaft being provided at its inner end with a carborundum stone shown at S, or other suitable grinding medium. The base frame B may be mounted on any suitable supporting means adjacent the grinding means, after which the disk 7 is adjusted in the manner previously described so as to bring the edge portion of the disk into proper engagement with the stone S, as illustrated in Figs. 1 and 2. After the disk has been adjusted, the motor M may be energized so as to cause rotation of the stone for sharpening the disk in the well known manner. During this sharpening process, the disk, due to the frictional engagement of the stone, will be rotated at a relatively low speed during the sharpening operation, thus insuring proper sharpening of the disk and effectually eliminating all danger of burning of the disk such as frequently occurs where a disk is held in stationary contact with a sharpening element of the character stated rotated at a relatively high speed.

It will be evident that there may be slight changes made in the construction and arrangement of the details of my invention without departing from the spirit and scope of the same, and I intend to include all such variations, as fall within the scope of the appended claims, in this application in which a preferred form only of my invention is disclosed.

What I claim is:

1. In a disk holding machine, a base plate, a shaft connected thereto by a ball and socket connection, means for securing said shaft in adjustment and for adjusting the shaft, and means for holding a disk loosely mounted on the shaft against movement axially thereof while permitting rotation of the disk, said means being adapted to retard free rotation of the disk when brought into engagement with a grinding or sharpening element.

2. In disk holding means, a base frame, a disk supporting shaft connected to said base frame at its lower end by a ball and socket connection, brace and adjusting rods pivotally secured at their upper ends to said shaft, said rods being pivotally secured at their lower ends to the base frame, means for supporting a disk on said shaft in adjustment axially thereof, and means for varying the effective lengths of said brace rods whereby the angular adjustment of the disk supporting shaft may be varied.

3. In disk holding means, a base frame, a disk supporting shaft connected thereto at its lower end by a ball and socket connection, adjusting and brace rods pivotally secured at their upper and lower ends to the shaft and base frame, respectively, said rods being adapted to have their effective lengths varied so as to vary the angular adjustment of said shaft, and means for supporting a disk mounted on said shaft so as to hold the same in adjustment longitudinally of the shaft, said means being adapted to frictionally grip the disk so as to retard rotation thereof.

4. In disk holding means, a base frame, a disk supporting shaft connected thereto at its lower end so as to have its angle to the vertical adjusted, means for adjusting said shaft and securing it in adjustment, means on the shaft for rotatably supporting a disk loosely mounted thereon and for limiting downward movement of the disk, a spider slidably mounted on the shaft and provided with members for engagement with a disk mounted thereon beneath the spider for holding the disk, in coöperation with the disk supporting means carried by the shaft, in adjustment axially of the shaft, and means for exerting downward pressure on said spider so as to grip the disk frictionally between the elements carried thereby and the supporting members of the shaft for the purpose of retarding free rotation of the disk.

5. In disk supporting means, a base frame, a disk supporting shaft connected to said base frame at its lower end so as to be angularly adjustable relative to the base frame, means for adjusting said shaft and securing it in adjustment, means carried by the shaft for rotatably supporting a disk mounted thereon, a substantially V-shaped frame pivotally secured at its lower end to the base frame for rocking movement toward and away from the disk supporting shaft, a pressure arm loosely connected at its upper end to the upper end of said frame, a spider slidably mounted on the disk supporting shaft above the disk supporting means carried thereby, said spider being provided with members adapted to engage the upper face of a disk mounted between the same and the disk supporting means of the disk supporting shaft, the inner end of said pressure arm being loosely connected to the spider so as to exert downward pressure thereon when the pressure arm is forced downwardly, and means for normally exerting downward pressure on said pressure arm.

In testimony whereof I affix my signature in presence of two witnesses.

ORVIS A. MESSERSMITH.

Witnesses:
A. G. WILLIAMS,
S. E. HALL.

Copies of this patent may be obtained for five cents each, by addressing the "Commissioner of Patents, Washington, D. C."